(12) United States Patent
Umeda et al.

(10) Patent No.: US 6,201,332 B1
(45) Date of Patent: Mar. 13, 2001

(54) AC GENERATOR STATOR FOR VEHICLE

(75) Inventors: Atsushi Umeda, Okazaki; Tsutomu Shiga, Nukata-gun; Shin Kusase, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/389,379

(22) Filed: Sep. 3, 1999

(30) Foreign Application Priority Data

Sep. 7, 1998 (JP) .................................................. 10-252816

(51) Int. Cl.⁷ ...................................................... H02K 3/12
(52) U.S. Cl. .......................... 310/184; 310/179; 310/180; 310/201; 310/206; 310/207
(58) Field of Search .................... 310/179, 180, 310/184, 206, 207, 257, 201

(56) References Cited

U.S. PATENT DOCUMENTS

| 1,822,261 | 9/1931 | Apple | 310/201 |
| 1,826,295 | 10/1931 | Apple | 310/201 |
| 4,402,129 | * 9/1983 | Kreuzer et al. | 310/184 |
| 4,707,629 | * 11/1987 | Wasko | 310/129 |
| 5,097,167 | 3/1992 | Kanayama et al. | 310/201 |
| 5,225,729 | * 7/1993 | Yang | 310/206 |
| 5,449,962 | * 9/1995 | Shichijyo et al. | 310/184 |

FOREIGN PATENT DOCUMENTS

92/06527  4/1992  (WO) .............................. H02K/3/12

* cited by examiner

*Primary Examiner*—Burton Mullins
(74) *Attorney, Agent, or Firm*—Pillsbury Madison & Sutro LLP

(57) ABSTRACT

In an alternator stator for vehicle, each of the phase-windings includes first and second coil-end groups at opposite axial ends the stator core. Each of the slots includes radially aligned six layers. Each of the phase-windings comprises a plurality of sets of U-shaped segments disposed in a pair of slots separated from each other by a pole-pitch and a plurality of connection segments formed from the U-shaped segments. Each of the sets includes a large segment having a pair of the conductor members disposed in the innermost and the outermost layers, a medium segment having a pair of the conductor members disposed in the layers inside the innermost and the outermost layers to be surrounded by the large segment at the first coil-end group, a small segment having a pair of conductor members respectively disposed in the middle two layers to be surrounded by the medium segment at the first coil-end group. The small segment of one of the sets is connected in series with the small segment of another adjacent thereto at the second coil-end group to form a wave winding. The large segment of one of the sets is connected in series with the medium segment of another of the sets adjacent thereto at the second coil-end group to form a lap winding. The wave winding and the lap winding are connected in series by the connection segments to form one of the plurality of phase-windings.

8 Claims, 9 Drawing Sheets

AC GENERATOR STATOR FOR VEHICLE

CROSS REFERENCE TO RELATED APPLICATION

The present application is based on and claims priority from Japanese Patent Application Hei 10-252816, filed Sep. 7, 1998, the contents of which are incorporated herein by reference.

BACKGROUND OF THE INVENTION

1. Field of the Invention

The present invention relates to an AC generator driven by an internal combustion engine, which can be mounted in a vehicle such as a passenger car, a truck or the like.

2. Description of the Related Art

It is well known that a plurality of U-shaped conductor segments are connected at the open ends thereof to form a phase winding of a multi-phase stator winding of an AC generator for a vehicle as is disclosed in International Publication Number WO 92/06527 (1992). The connected open-end portions (hereinafter referred to as the connected portions) of the conductor segments are disposed at one axial end of a stator core to be soldered or welded. Four conductor segments are respectively inserted in slots of a stator to form a four-turn one-phase winding. In this conventional structure, many specific segments are necessary to connect the four windings together, and to provide a pair of output terminals. That is, five specific segments are required to form a four-turn-one-phase winding, and 15 specific segments are required for a three-phase four-turn stator winding.

SUMMARY OF THE INVENTION

Therefore, a main object of the present invention is to provide a vehicular AC generator stator which has a stator winding which does not as many specific segments as the conventional stator.

Another object of the present invention is to provide a vehicular AC generator having a stator winding free from the interference of conductor segments.

Another object of the present invention is to provide a vehicular AC generator having coil ends in which the distance between the connected portions of segments is kept to be suitable for automatic winding.

In an alternator stator for a vehicle according to an embodiment of the present invention, each of the plurality of phase-windings is composed of a lap winding unit having a plurality of lap-wound coils and a wave winding unit having a plurality of wave-wound coils, and the lap winding unit and the wave winding unit respectively have a plurality of conductor members disposed in the same one of the slots. As a result, a limited number of types of basic conductor segments are connected to form a stator winding by a limited number of connection segments that are derived or formed from the basic conductor segments.

In the alternator stator, the number of the conductor members in the same one of the slots can be expressed as (4n+2), where n is a natural number. In the alternator stator, each phase-winding preferably has a first coil-end group in which the conductor members overlap with one another at an axial end of the stator core and a second coil-end group in which the conductor members are connected to provide both the lap-wound coils and the wave-wound coils.

It is more preferable that each of the plurality of phase windings includes a plurality of U-shaped segments having a pair of the conductor members and an integral turn portion which is disposed in the first coil-end group, and the conductor members are welded in the second coil-end group.

It is further preferable that the conductor members are disposed in the slot to be aligned radially, and one of the conductor members disposed in the radially outermost layer is connected, in the first coil-end group, to another of the conductor members disposed in the radially innermost layer in another slot spaced apart therefrom in one circumferential direction, and is connected, in the second coil-end group, to another of the conductor members disposed in the layer adjacent to the radially outermost layer in another slot spaced apart therefrom in the other circumferential direction.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
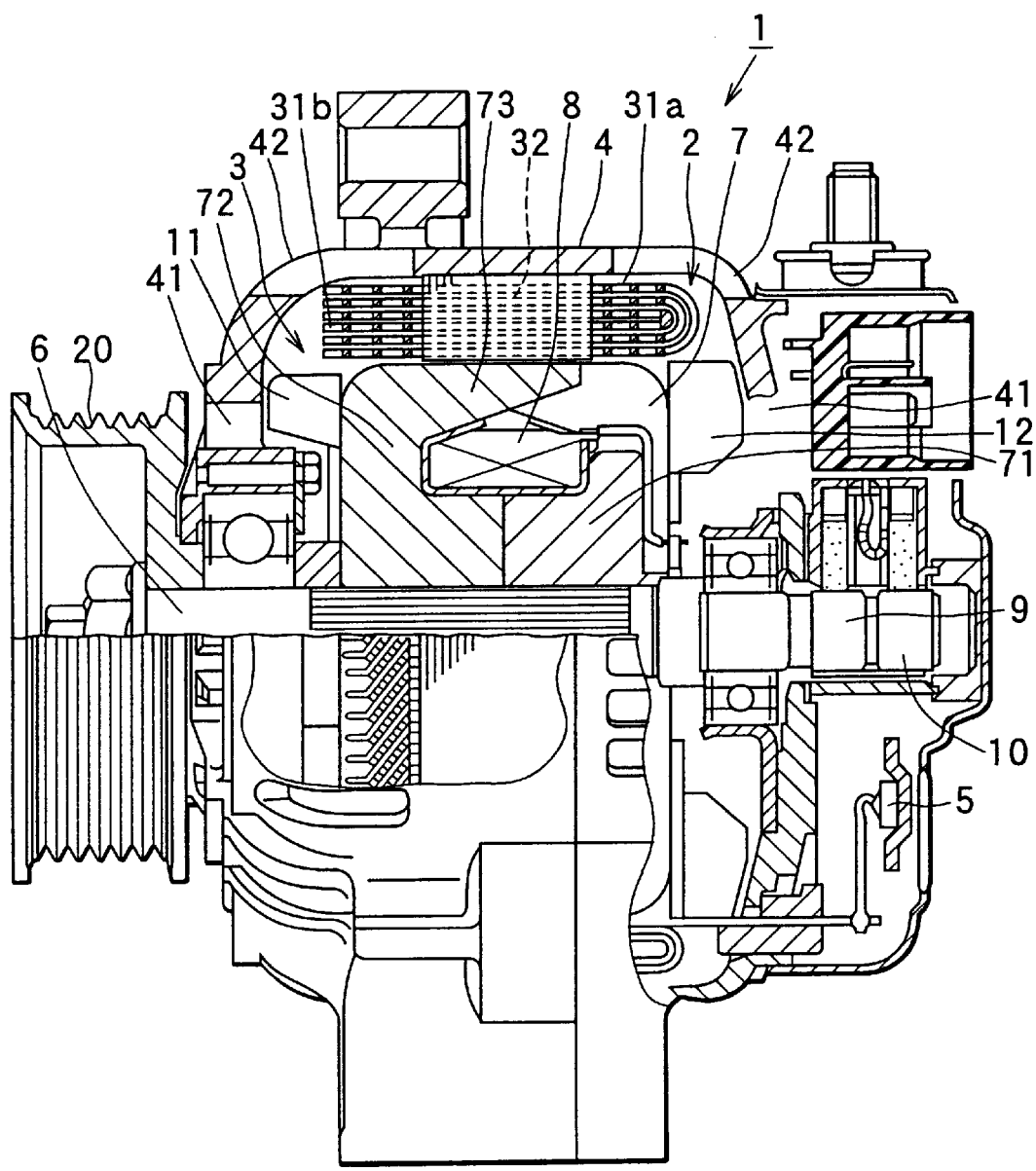
FIG. 1 is a cross-sectional view of the vehicular AC generator according to a first embodiment of the present invention.

A stator of an alternator for a vehicle according to a first embodiment of the present invention is described with reference to FIGS. 1–9.

An AC generator 1 includes a stator 2, a rotor 3, a housing 4 supporting the stator 2 and the rotor 3, and a rectifier 5 converting AC current to DC current.

The rotor 3 has a shaft 6, pole-core 7, a field coils 8, slip-rings 9 and 10, and cooling fans 11 and 12. The shaft 6 is connected to a pulley 20 and is rotated by a vehicular engine (not shown).

The pole-core 7 is composed of a pair of pole-core pieces. Each of the pair of pole-core pieces has a boss portion 71 press-fitted to the shaft 6, a disk portion 72 extending radially from both ends of the boss portion 71, and twelve claw poles 73.

The housing 4 has a plurality of air-intake windows 41 at the opposite axial ends thereof and a plurality of cooling-air-discharge windows 42. The discharge windows 42 are formed to correspond to the radially outside portions of first and second coil-end groups 31a and 31b, at a pair of shoulders formed on the outer-periphery of the housing 4.

The stator 2 has a stator core 32, three phase-windings, and insulators 34 insulating the conductor members from the stator core 32. The stator core 2 has thirty-six slots 35 at the inner periphery thereof at equal intervals.

Figure 2:
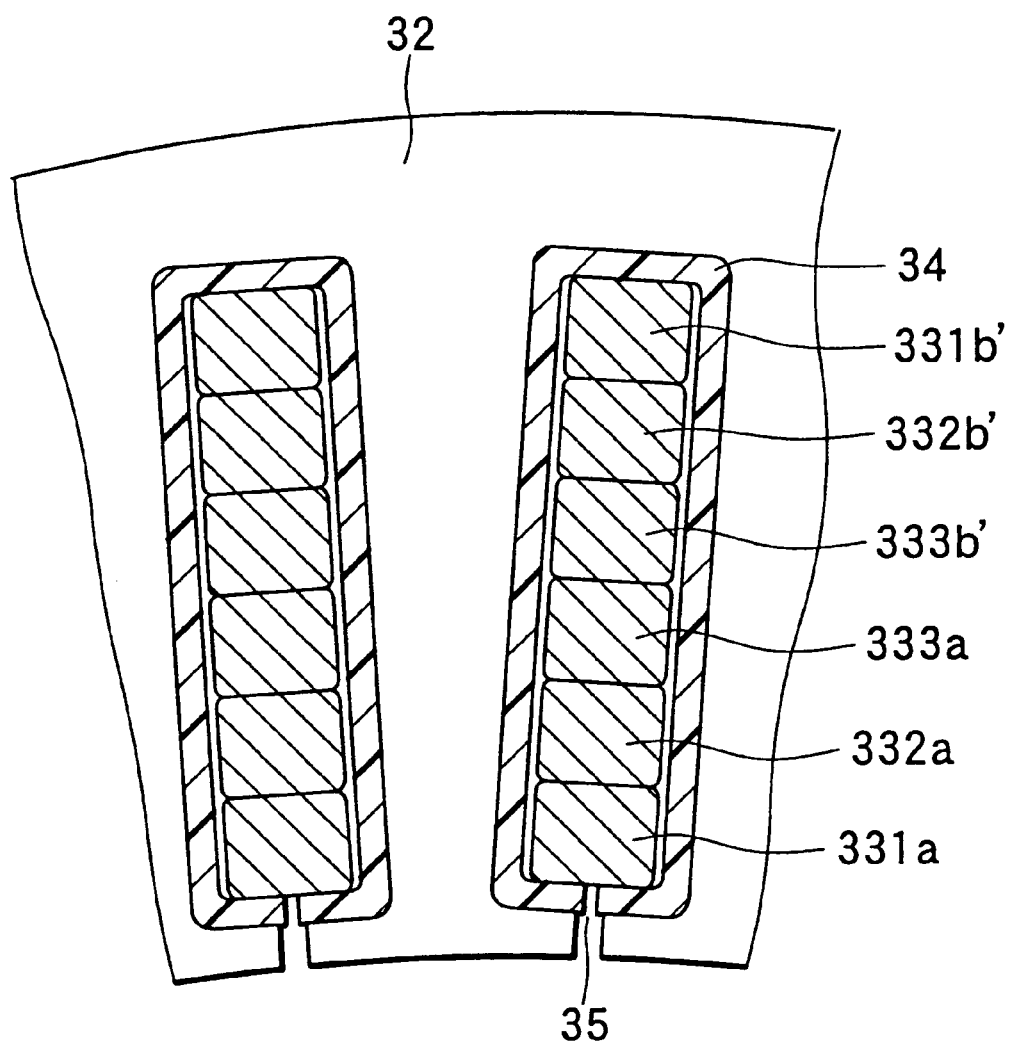
FIG. 2 is a fragmentary cross-sectional view of the stator according to the first embodiment.

Each of the three phase-windings is mainly composed of three kinds of U-shaped basic conductor segments 33: large segments 331, medium segments 332 and small segments 333. As shown in FIG. 2, six conductor members are disposed in radially aligned six layers: a radially innermost first layer of the slot, a second layer, a third layer, a fourth layer, a fifth layer, and a radially outermost sixth layer.

Figure 3:
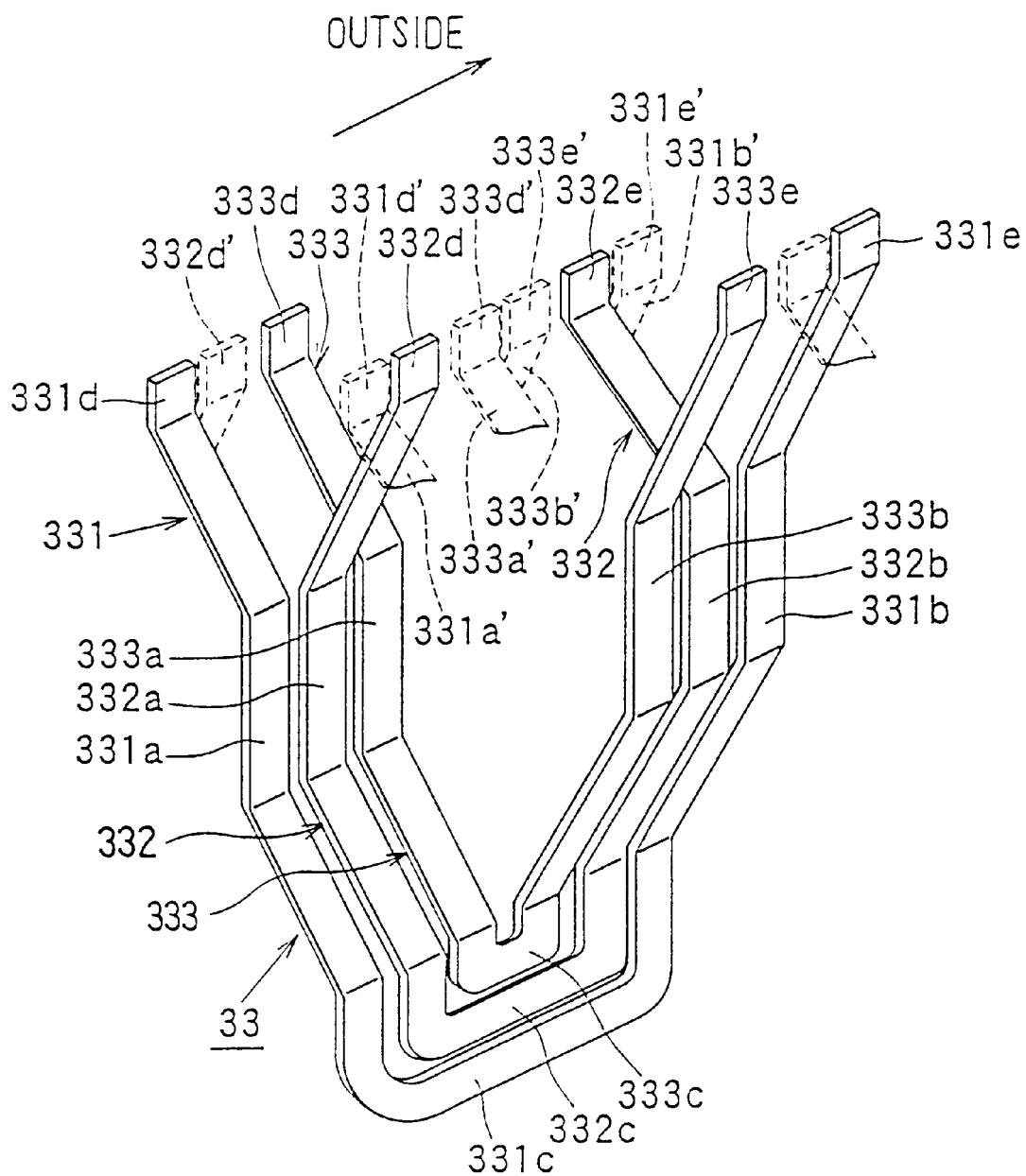
FIG. 3 is a schematic perspective view of conductor segments according to the first embodiment.

As shown in FIG. 3, the large segment 331 includes a conductor member 331a having a connected portion 331d at one end thereof, an integral turn portion 331c, and a conductor member 331b having a connected portion 331e at the other end. The medium segment 332 includes a conductor member 332a having a connected portion 332d at one end, an integral turn portion 332c, and a conductor member 332b having a connected portion 332d at the other end. Similarly, the small segment 333 includes a conductor member 333a having a connected portion at one end 333d, an integral turn portion 333c, and a conductor member 333b having a connected portion 333e at the other end.

A set of the basic segments 33 composed of the U-shaped small segment 333, the U-shaped medium segment 332, and the U-shaped large segment 331 are arranged as shown in FIG. 3.

In the first coil-end group 31a, the turn portion 332c of the medium segment 332 surrounds the turn portion 333c, and the turn portion 331c of the large segment 331 surrounds the turn portion 332c of the medium segment.

In the second coil-end group 31b, the connected portions 331d and 331e of the large segment 331 are inclined to expand in the opposite circumferential directions by a 1.5-slot interval. The connected portions 332d and 332e of the medium segment 332 are inclined to close in the opposite circumferential directions by a 1.5-slot interval. The connected portions 333d and 333e of the small segment 333 are also inclined to expand by a 1.5-slot interval.

Then, one conductor member 331a of the large segment 331 is inserted in the first layer of one of a pair of slots separated from each other by a pole-pitch, one conductor member 332a of the medium conductor 332 is inserted in the second layer thereof, and one conductor member 333a of the small segment 333 is inserted in the third layer thereof. The other conductor member 331b of the large segment 331 is inserted in the sixth layer of the other of the pair of slots separated therefrom by a pole-pitch in the clockwise direction, the other conductor member 332b of the medium-sized conductor 332 is inserted in the fifth layer of the other slot, and the other conductor member 333b of the small segment 333 is inserted in the fourth layer of the other slot.

The above described process is repeated until all the segments 33 are inserted into all the slots 35. As a result, straight portions of the conductor members 331a, 332a, 333a are inserted into one of the slots together with conductor members 331b', 332b' and 333b' of another set of basic segments 33, which have the other conductor members inserted into one of the slots a pole-pitch separated from each other, as shown in FIG. 2. All the connected portions are disposed on the extreme end of the second coil-end group 31b, and a welder can reach directly each of the connected portions from outside.

Then, the connected portion 332d of the medium segment 332 extending from the second layer of one slot 35 and the connected portion 331d' of a large segment 331 extending from the adjacent first layer of another slot 35, which is separated clockwise therefrom by a pole-pitch, are disposed side by side and welded together. The connected portion 333d' of one small segment 333 extending from the third layer of one slot 35 and a connected portion 333e' of another small segment 333 extending from the adjacent fourth layer of another slot 35, which is separated counter-clockwise therefrom by a pole-pitch, are disposed side by side and welded together. The connected portion 332e of the medium segment 332 extending from the fifth layer of the one slot 35 and a connected portion 331e' of a large segment 333 extending from the adjacent sixth-layer of another slot 35, which is separated counter-clockwise therefrom by a pole-pitch, are disposed side by side and welded together.

The above described process is repeated, so that the basic segments 33 form four windings 311, 312, 313 and 314, in which the connected portions in the second coil-end group do not overlap with one another in the radial direction.

As a result, the inner half of the six conductor members in the first coil-end group 31a are inclined in one circumferential direction and the outer half thereof are inclined in the other circumferential direction. On the other hand, the conductor members of respective layers in the second coil-end group 31b are inclined alternately in the opposite circumferential directions. Thus three-fold connected rings are formed in the second coil-end group 31b, and the connected portions can be spaced apart from each other in the radial direction to be welded easily.

A winding diagram of a X-phase winding 315 is described with reference to FIGS. 4–8, in which the conductor members 331a in the first layer of the slot 35 are illustrated by chain lines, the conductor members 332a in the second layer are illustrated by thin broken lines, the conductor members 333a in the third layer are illustrated by thin solid lines, the conductor members 333b in the fourth layer are illustrated by two-dot chain lines, the conductor members 332b in the fifth layer are illustrated by thick broken lines, and the conductor members 331b in the sixth layer are illustrated by thick solid lines.

The first coil-end group 31a are located at upper portions of the drawings, and the second coil-end group 31b are located at lower portions of the drawings. The numbers laterally lined up at the middle of the drawings indicate slot numbers.

Figure 4:
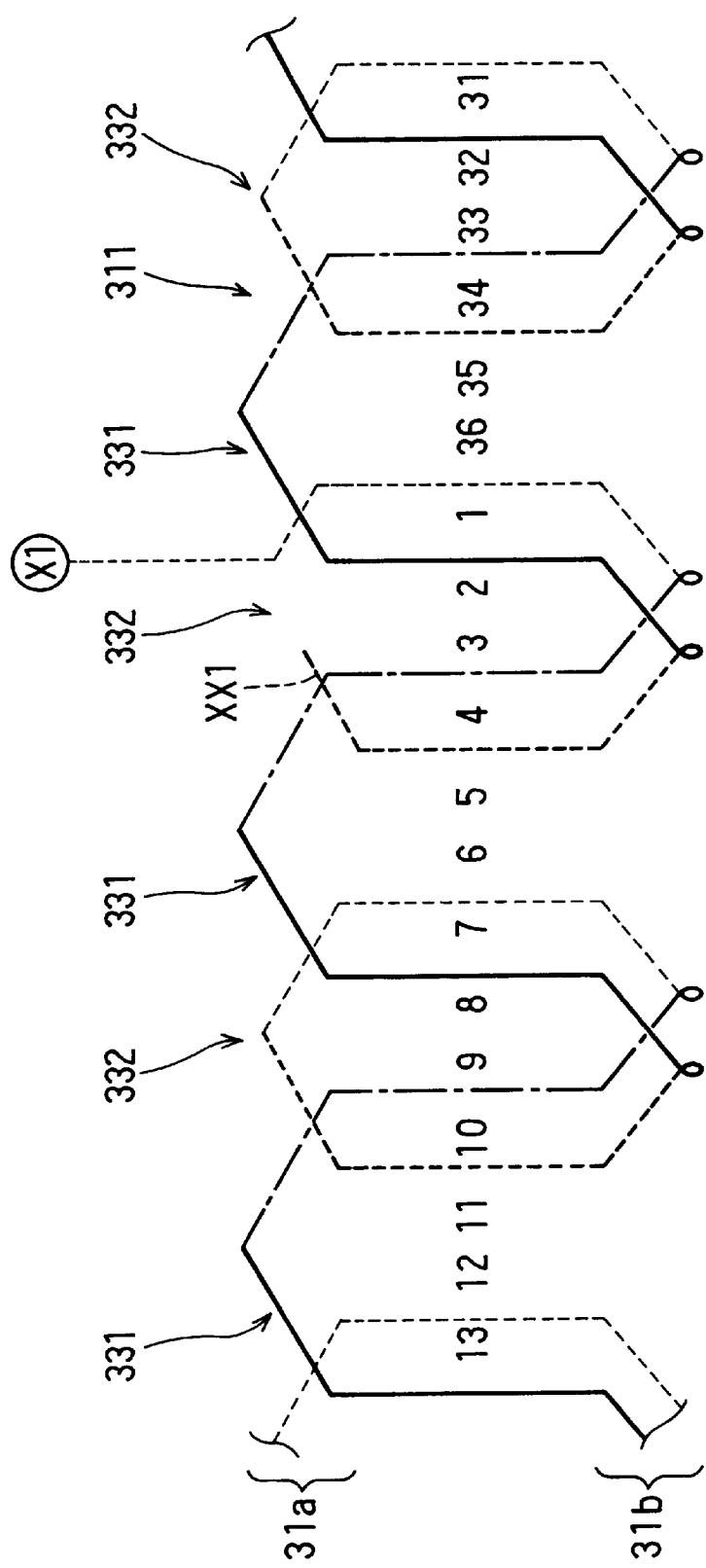
FIG. 4 is a winding diagram of a portion of a stator winding according to the first embodiment.

As shown in FIG. 4, the conductor members of the medium segments 332 extending from the second layer (thin-broken line) are connected with the conductor members of the large segments 331 extending from the first layer (one-dot chain line) of another slot separated clockwise therefrom by one pole-pitch. The conductor member of the large segments 331 extending from the sixth layer (thick solid line) of one slot is connected with the conductor members of the medium segments 332 extending from the fifth layer (thick broken line) of another slot separated clockwise therefrom-by one pole-pitch. As a result, the first winding 311 having two-turn lap-wound coils is formed.

Figure 5:
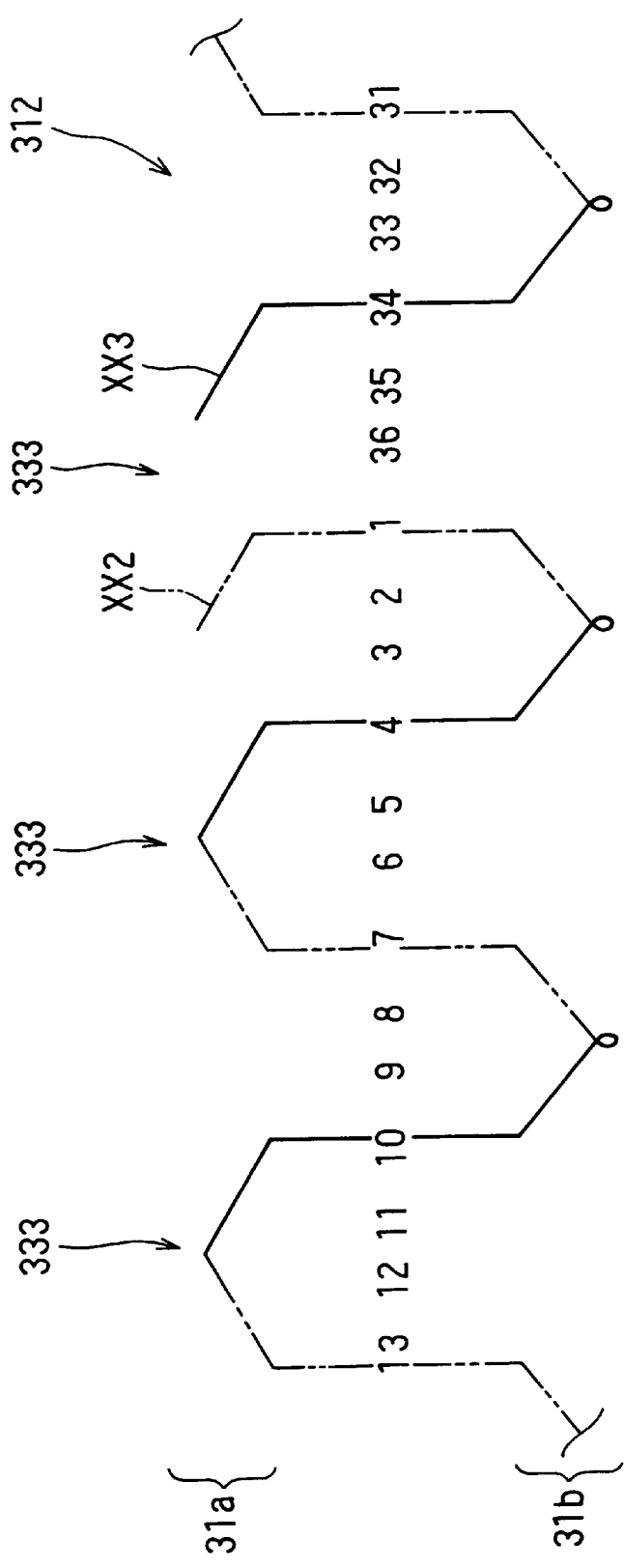
FIG. 5 is a winding diagram of a portion of the stator winding according to the first embodiment.

As shown in FIG. 5, the conductor member of small segments 333 extending from the fourth layer (two-dot chain line) of one slot is connected with the conductor member of the small segments 333 extending from the third layer of another slot (thin solid line) separated clockwise therefrom by one pole-pitch. Accordingly, the second winding 312 having one-turn-wave-wound coils is formed.

Figure 6:
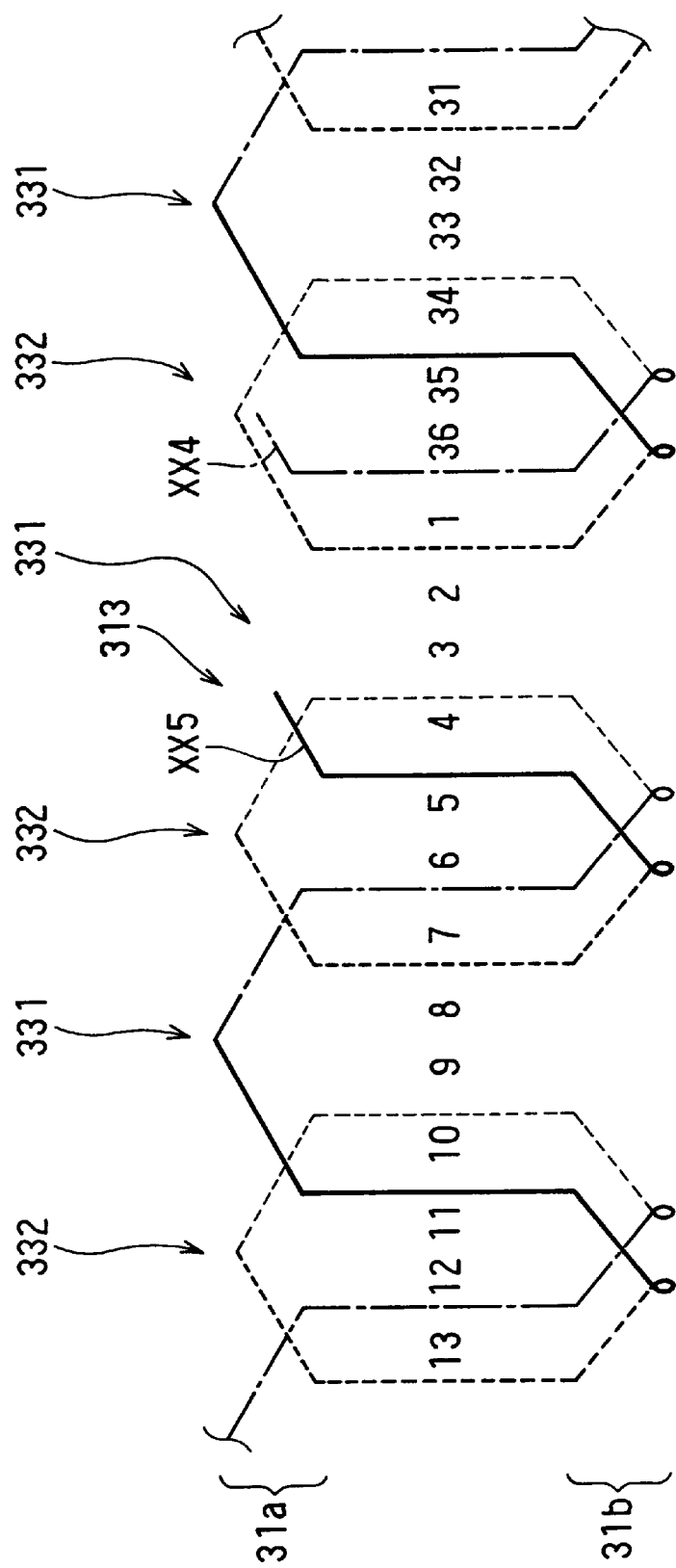
FIG. 6 is a winding diagram of a portion of the stator winding according to the first embodiment.
Figure 7:
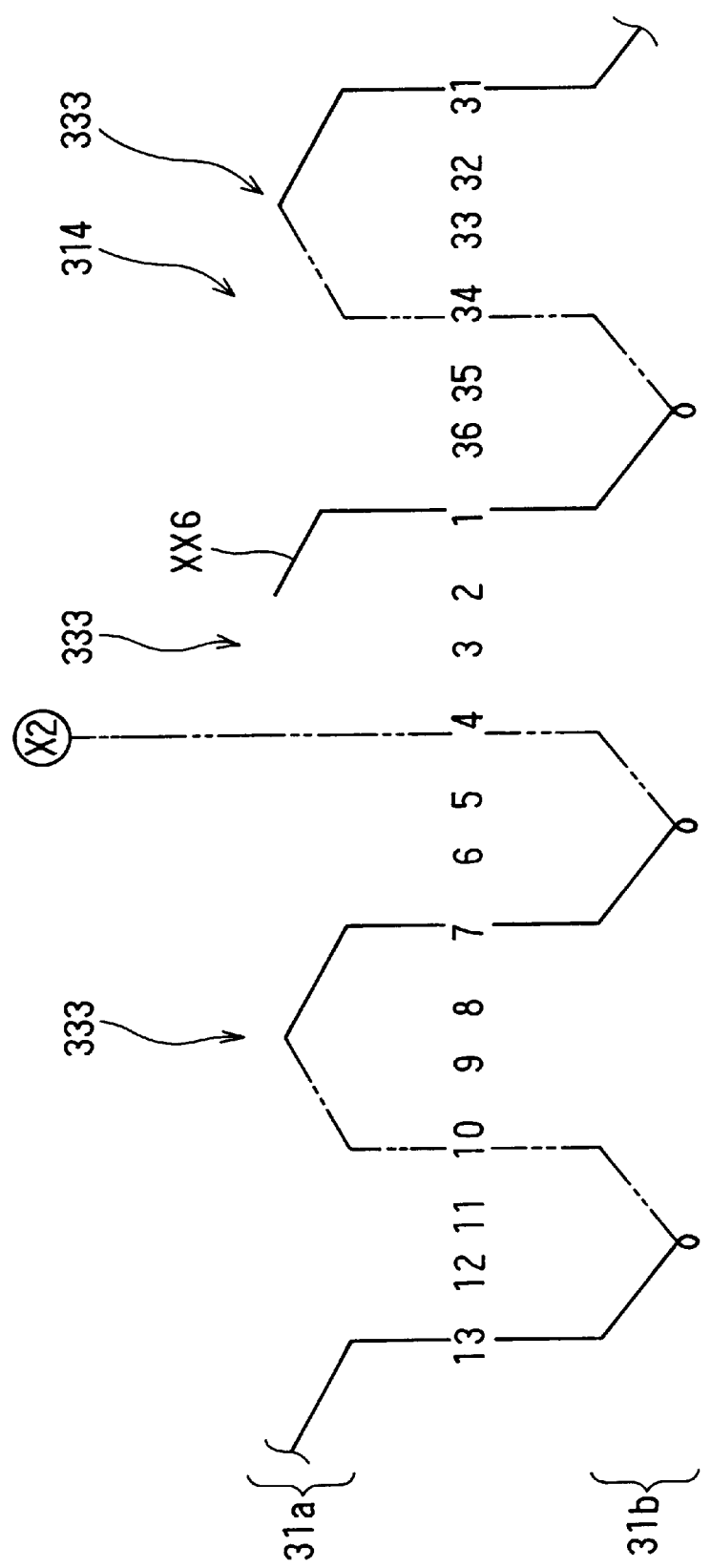
FIG. 7 is a winding diagram of a portion of the stator winding according to the first embodiment.

As shown in FIG. 6, the third winding 313 having two-turn lap-wound coils is formed by connecting the large segments 331 and the medium segments 332 in the same manner as the first winding 311, and, as shown in FIG. 7, the fourth-winding 314 having a one-turn wave-wound coils is formed by connecting the small segments 333 each other in the same manner as the second winding 312.

Figure 8:
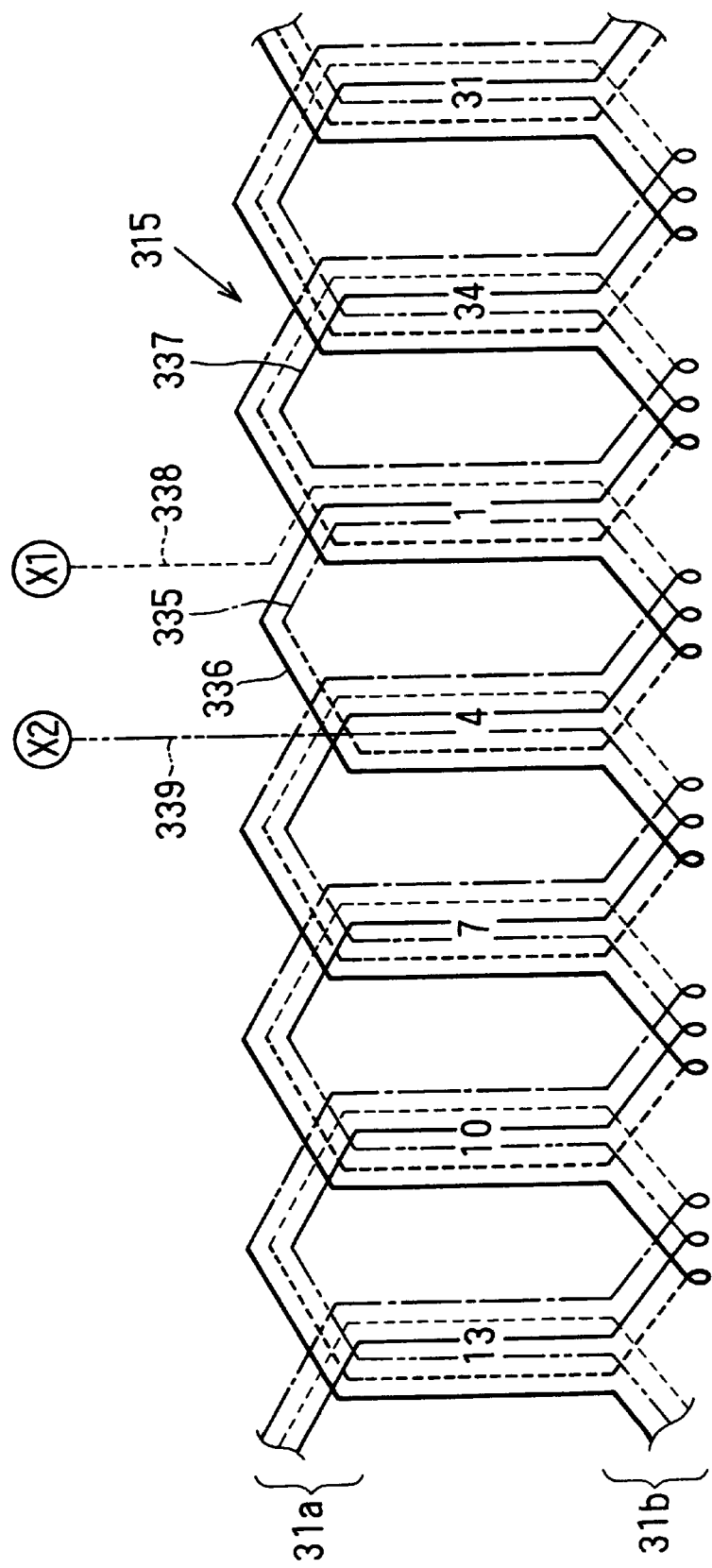
FIG. 8 is a main winding diagram of the stator winding according to the first embodiment.

Then, an end XX1 of the first winding 311 is connected with an end XX2 of the second winding 312, an end XX3 of the second 312 is connected with an end XX4 of the third winding 313, and an end XX5 of the third winding 313 is connected with an edge portion XX6 of the fourth winding 314. Accordingly, a winding 315 having six conductor members per slot or a six-turn coil per pole is formed as shown in FIGS. 8.

The X-phase winding has the following five connection segments that are derived or formed from the basic segments 33: a first connection segment 335 connecting to the end XX2 of the second winding 312 that includes the end XX1 of the first winding 311, a second connection segment 336 connecting to the end XX4 of the third winding 313 that includes the end XX3 of the second winding 312, a third connection segment 337 connecting to the end XX6 of the fourth winding 314 that includes the end XX5 of the third winding 313, a fourth connection segment 338 connecting to the lead wire X1 that includes an end cut from the end XX1, and a fifth connection segment 339 connecting to the lead wire X2 that includes an end cut from the end XX6.

In other words, the first connection segment 335 and the fifth connection segment 338 are formed from one of the medium basic segment 332 disposed in #1 and #4 slots 35 having the turn portion 332c, which is cut at the middle of the turn portion as shown in FIG. 4. The second connection segment 336 is formed from one of the small basic segments 333 disposed in #1 and #34 slots 35, which is cut at the middle of the turn portion as shown in FIG. 5. Similarly, the third connection segment 336 is formed from the large basic segments 331 disposed in #1 and #4 slots 35, which is cut at the middle of the turn portion as shown in FIG. 6, and the fourth connection segment 337 is formed from the small basic segment 333 disposed in #1 and #4 slots, which is cut at the middle of the turn portion as shown in FIG. 7.

The four windings, which have connection segments respectively formed from some of the basic segments 33, are connected with one another to form the winding 315. Accordingly, no specific tool, device, die or material is necessary to provide such connection segments.

Likewise, the Y-phase and the Z-phase windings are formed in the slots respectively shifted by 120 degrees in electrical phase. The lead wires X1, Y1, and Z1 of the X-phase, Y-phase and Z-phase windings (not shown) are respectively connected to the rectifiers 5. The lead wire X2 is connected with the lead wires Y2 and Z2 (not shown) to form a neutral point.

Figure 9:
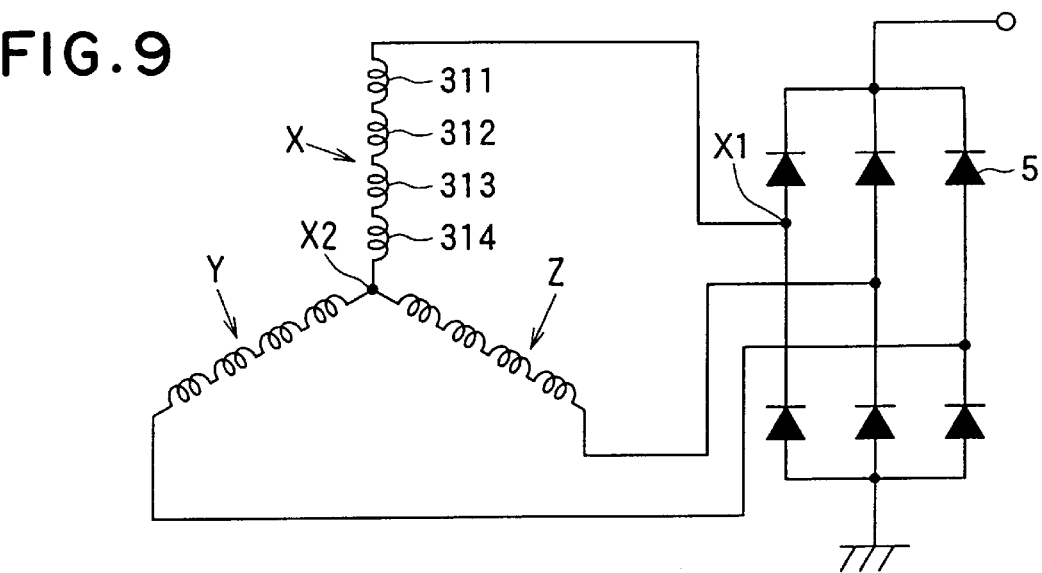
FIG. 9 is a circuit diagram according to the first embodiment.
Figure 10:
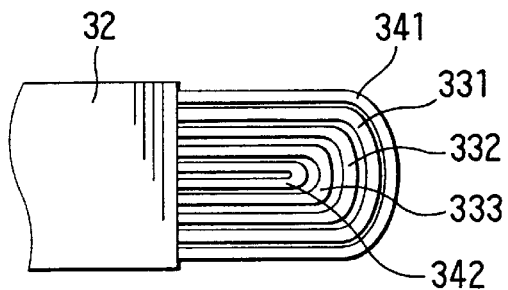
FIG. 10 is a schematic view of a coil-end group of a stator according to a second embodiment of the present invention.

As shown in FIG. 9, these three-phase windings are connected in a star shape. In the winding shown in FIG. 8, the lead wire X1 connected with the rectifier 5 extends from the first coil-end-group.

The large segment 331, the medium segment 332 and the small segment 333 can be formed of a copper plate one by one or at the same time. Each of the basic segments 331–333 can be formed from a straight rectangular conductor rod. The turn portion also can be shaped semi-circular.

According to the present invention, a different number other than 6, such as 10, 14 or a number (4n+2), of conductor members (n is a natural number) can be disposed radially in each slot 35 in the same manner as described above.

A stator winding according to a second embodiment is mainly composed of the three kinds of U-shaped basic conductor segments 331, 332, and 333 used in the first embodiment and a largest basic segment 341 surrounding the same and a smallest basic segment 342 surrounded by the small segment 333. The conductor members in the innermost first layer form a winding having wave wound coils, the conductor members in the second, third, fourth and fifth layers respectively form windings having lap-wound coils. These windings are connected by seven connection segments, thereby forming a one of the phase windings in the same manner as those in the first embodiment.

If the number of the U-shaped basic conductor segments to be disposed in a pair of slots increases to fourteen or eighteen, two or four connection segments have to be added. Thus, the number of the connection segments increases by two as every four conductor members increase.

That is, if the number of the U-shaped basic segments each set is 4n+2, the number of the connection segments becomes 2n+3.

Figure 11:
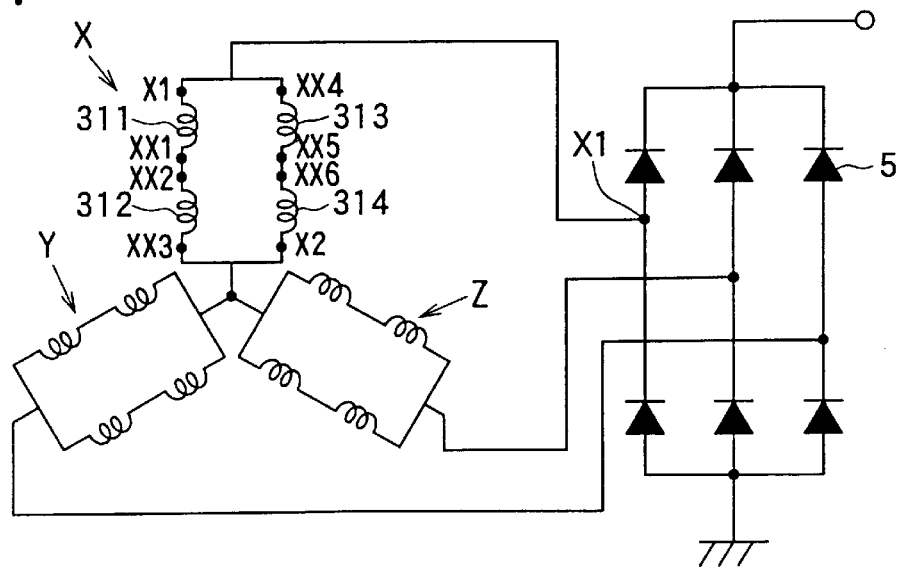
FIG. 11 is a circuit diagram according to the third embodiment.

The series-connected winding of the first and second windings 311 and 312 in the first embodiment is connected in parallel with those of the third and fourth windings 313 and 314 therein as shown in FIG. 11.

In this way, the winding having 4n+2 conductor members per slot (n: a natural number) is divided to two windings and they are connected in parallel, thereby providing the winding comprising 2n+1 turns, that is, odd turns per slot.

A stator core having 72 slots and a three-phase stator winding disposed therein can be combined with a rotor having 12 poles. The stator can have a pair of parallelly connected three-phase windings. Further, X-phase, Y-phase and Z-phase windings can be connected in a delta connection.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator stator for a vehicle including a stator core having a plurality of slots and a plurality of phase-windings disposed in said slots, wherein each of said plurality of phase-windings is composed of a lap winding unit having a plurality of series-connected multi-turn lap-wound coils and a wave winding unit having a plurality of series-connected one-turn wave-wound coils, and said lap winding unit and said wave winding unit respectively have a plurality of conductor members disposed in the same one of said slots.

2. An alternator stator for a vehicle as claimed in claim 1, wherein said lap winding comprises a first winding and a third winding, said wave winding unit comprises a second winding and fourth winding, and said second winding is connected between said first and third windings.

3. An alternator stator for a vehicle including a stator core having a plurality of slots and a plurality of phase-windings disposed in said slots, wherein each of said plurality of phase-windings is composed of a lap winding unit having a plurality of lap-wound coils and a wave winding unit having a plurality of wave-wound coils, said lap winding unit and said wave winding unit respectively have a plurality of conductor members disposed in the same one of said slots, and the number of said conductor members in the same one of said slots is (4n+2), where n is a natural number.

4. An alternator stator for a vehicle as claimed in claim 3, wherein each of said plurality of phase-windings has a first coil-end group in which said conductor members overlap with one another at an axial end of said stator core and a second coil-end group in which said conductor members are connected to provide both said lap-wound coils and said wave-wound coils.

5. An alternator stator for a vehicle in claim 4, wherein each of said plurality of phase windings comprises a plurality of U-shaped segments having a pair of said conductor members and an integral turn portion which is disposed in said first coil-end group, and said conductor members are welded in said second coil-end group.

6. An alternator stator for a vehicle in claim 4, wherein said conductor members are disposed in said slot to be aligned radially, and one of said conductor members disposed in the radially outermost layer is connected, in said first coil-end group, to another of said conductor members disposed in the radially innermost layer in another slot spaced apart therefrom in one circumferential direction, and is connected, in said second coil-end group, to another of said conductor members disposed in the layer adjacent to said radially outermost layer in another slot spaced apart therefrom in the other circumferential direction.

7. An alternator stator for a vehicle including a stator core having a plurality of slots and a plurality of phase-windings disposed in said slots, wherein each of said plurality of phase-windings is composed of a lap winding unit having a plurality of lap-wound coils and a wave winding unit having a plurality of wave-wound coils, said lap winding unit and said wave winding unit respectively have a plurality of conductor members disposed in the same one of said slots, said lap winding comprises a first winding and a third winding, said wave winding unit comprises a second winding and fourth winding, and said second winding is connected between said first and third windings, and said first winding and said second winding are connected in series with each other to form a first half winding, said third winding and fourth winding are connected in series with each other to form a second half winding, and said first half winding and second half winding are connected in parallel with each other to form one of said phase-windings.

8. An alternator stator for vehicle comprising:

a stator core having a plurality of slots;

a plurality of phase-windings disposed in said slots, each of said plurality of phase-windings including first and second coil-end groups at opposite axial ends of said stator core; wherein each of said slots comprises radially aligned layers composed of an innermost first layer, an inner second layer, an inner middle third layer, an outer middle fourth layer, an outer fifth layer and an outermost sixth layer, each of said phase-windings comprises a plurality of sets of U-shaped segments disposed in a pair of slots separated from each other by a pole-pitch and a plurality of connection segments formed from said U-shaped segments, each of said plurality of sets comprises a large segment having a pair of said conductor members disposed in said first and sixth layers, a medium segment having a pair of said conductor members disposed in second and fifth layers to be surrounded by said large segment at said first coil-end group, a small segment having a pair of conductor members respectively disposed in said third and fourth layers to be surrounded by said medium segment at said first coil-end group, said small segment of one of said plurality of sets is connected in series with said small segment of another adjacent thereto at said second coil-end group to form a wave winding, said large segment of one of said plurality of sets is connected in series with said medium segment of another of said plurality of sets adjacent thereto at said second coil-end group to form a lap winding, and said wave winding and lap winding are connected in series by said connection segments to form one of said plurality of phase-windings.

\* \* \* \* \*